WALTER SCHAPER & WILLIAM SCHAPER.
DEVICE FOR GUIDING HORSES.
APPLICATION FILED OCT. 1, 1912.

1,062,508.

Patented May 20, 1913.

Witnesses
Hugh H. Ott
Geo. Ackman Jr.

Inventors
Walter Schaper
William Schaper
By Victor J. Evans
Attorney

UNITED STATES PATENT OFFICE.

WALTER SCHAPER AND WILLIAM SCHAPER, OF CHARLES CITY, IOWA.

DEVICE FOR GUIDING HORSES.

1,062,508.  Specification of Letters Patent.  Patented May 20, 1913.

Application filed October 1, 1912.  Serial No. 723,385.

*To all whom it may concern:*

Be it known that we, WALTER SCHAPER and WILLIAM SCHAPER, citizens of the United States, residing at Charles City, in the county of Floyd and State of Iowa, have invented new and useful Improvements in Devices for Guiding Horses, of which the following is a specification.

An object of the invention is to provide a device for driving several horses abreast with only two lines or reins.

The invention embodies, among other features, devices which when used in driving four horses abreast, are attached to the outermost horses and then to the inner horses so that the outer horses will be guided by the inner horses, the reins or lines whereby the operator guides the horses being connected to the inner horses so that by simply guiding the inner horses in the usual manner, the outer horses will also be steered or guided in the proper direction, thus obviating the necessity of using or employing one or more extra reins in guiding four horses, the same number of reins being employed to guide four horses as are employed to guide two horses.

Figure 1:
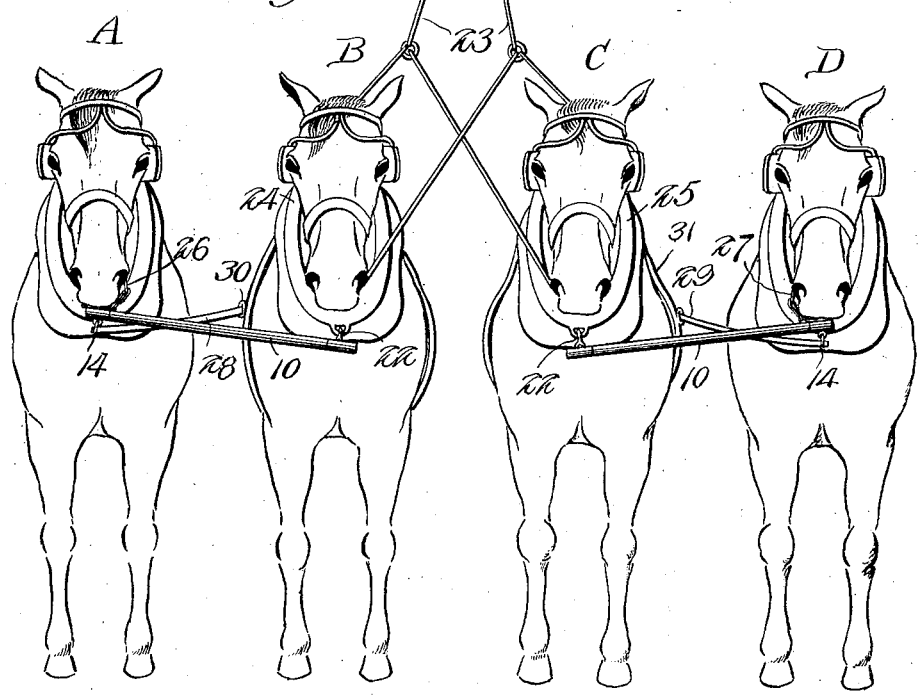
Figure 2:
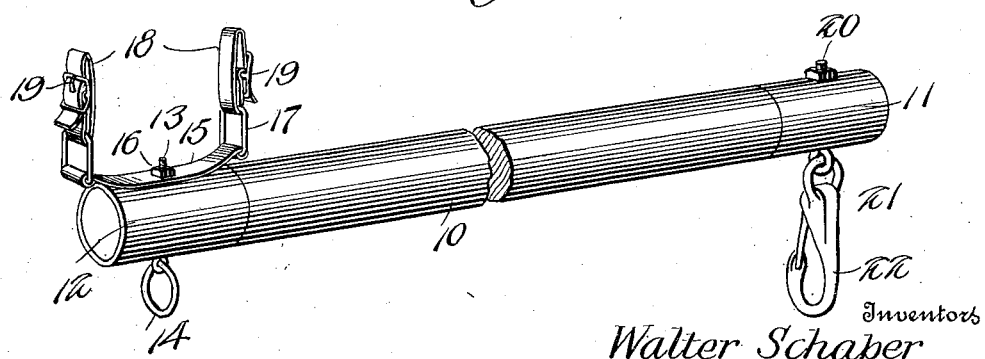

In the further disclosure of the invention reference is to be had to the accompanying drawings, constituting a part of this specification, in which similar characters of reference denote corresponding parts in all the views, and in which:

Figure 1 is a front elevation showing the device in applied position; and Fig. 2 is a perspective view of the device.

Referring more particularly to the views, use is made of a guide bar 10 having the ends thereof reduced to receive sockets 11, 12, an eye bolt 13 being passed transversely through the socket 12 and the end of the guide bar 10 to which the socket 12 is secured, the said eye bolt having a ring 14 mounted thereon and having the free end thereof passed through a curved plate 15, a suitable nut 16 being mounted on the eye bolt to retain the plate 15 rigidly on the socket 11, the ends of the said plate being bent to form eyelets carrying stirrups 17 having straps 18 mounted thereon and provided with buckles 19, the strap and buckle on the outer end of the plate 15 being preferably termed an outer attaching member and the strap and buckle on the inner end of the plate 15 being preferably termed an inner attaching member. An eye bolt 20 is passed transversely through the socket 12 and the reduced end of the guide bar 10 having the socket mounted thereon, and mounted to swing on the eye bolt is an attaching member 21 consisting of a hook 22 of any well known type.

Now referring to Fig. 1, in the use of the device described, I disclose four horses A, B, C and D arranged abreast, B and C being the inner horses and A and D the outer horses. The horses are harnessed in the usual manner but only two reins 23 are used to guide the horses, the reins 23 being connected to the inner horses B and C as shown. A plurality of the devices described for guiding the horses are now employed in connection with the horses A, B, C and D, one of the guide bars 10 being used to connect the horses A and B and another of the guide bars 10 being used to connect the horses C and D. The attaching members 21, comprising hooks 22 of any well known type, of the first and second guide bars 10 are now attached to the usual hames 24, 25 of the horses B and C respectively and the straps 18 of the first and second guide bars 10 are connected to the usual bit rings 26, 27 of the outermost horses A and D respectively. Hitching or tying straps 28, 29 for the respective first and second guide bars 10 are now attached to the rings 14 and are passed rearwardly to connect with the usual pads 30, 31 of the horses B and C respectively. It will now be seen that with the guide bars mounted in the manner mentioned, when a pull is exerted on one of the reins 23 the inner horses B and C will be guided by the pull on the reins and in view of the guide bars 10 connecting the outer horses A and D with the respective inner horses B and C in the manner mentioned, the outer horses will naturally move in the direction of the pull on the inner horse, as will be readily understood. The straps 28, 29 can be dispensed with in the use of the guide bars 10 in the manner mentioned, although the same are preferably employed in order to retain the guide bars in proper position to insure the proper operation thereof.

It will be understood that various changes can be made in the device disclosed without departing from the spirit of the invention and the device can be applied to more or less than four horses abreast, it being further understood that the scope of the invention is defined by the appended claim.

Having thus described our invention, we claim:

In a device for guiding horses, the combination with the harness of the horses comprising saddles, collars, bridle bits and bit rings, of a guide bar, an attaching member on one end of the guide bar and having connection with the collar of the harness of one of the horses, a plate on the other end of the guide bar and having connection with the bit rings of the harness on the other horse, and a ring carried by the guide bar and having a strap of the harness of one of the horses connected thereto and extending rearwardly to connect with the saddle of the other horse.

In testimony whereof we affix our signatures in presence of two witnesses.

WALTER SCHAPER.
WILLIAM SCHAPER.

Witnesses:
I. N. SNYDER,
ERVIN DE TIENNE.

---

Copies of this patent may be obtained for five cents each, by addressing the "Commissioner of Patents, Washington, D. C."